(12) United States Patent
Moore

(10) Patent No.: US 9,160,713 B2
(45) Date of Patent: *Oct. 13, 2015

(54) FILTERING NETWORK DATA TRANSFERS

(71) Applicant: Centripetal Networks, Inc., Herndon, VA (US)

(72) Inventor: Sean Moore, Hollis, NH (US)

(73) Assignee: Centripetal Networks, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,755

(22) Filed: May 3, 2015

(65) Prior Publication Data

US 2015/0237012 A1    Aug. 20, 2015

Related U.S. Application Data

(63) Continuation of application No. 13/795,822, filed on Mar. 12, 2013, now Pat. No. 9,124,552.

(51) Int. Cl.
*H04L 29/06* (2006.01)
*G06F 15/16* (2006.01)
*H04L 29/08* (2006.01)

(52) U.S. Cl.
CPC ........ *H04L 63/0254* (2013.01); *H04L 63/1466* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 6,226,372 | B1 | 5/2001 | Beebe et al. |
| 6,317,837 | B1 | 11/2001 | Kenworthy |
| 6,611,875 | B1 | 8/2003 | Chopra et al. |
| 7,478,429 | B2 | 1/2009 | Lyon |
| 7,539,186 | B2 | 5/2009 | Aerrabotu et al. |
| 7,684,400 | B2 | 3/2010 | Govindarajan et al. |
| 7,710,885 | B2 | 5/2010 | Ilnicki et al. |

(Continued)

FOREIGN PATENT DOCUMENTS

| | | |
|---|---|---|
| EP | 1313290 A1 | 5/2003 |
| EP | 1677484 A2 | 7/2006 |

(Continued)

OTHER PUBLICATIONS

Communication Relating to the Results of the Partial International Search for International App. No. PCT/US2015/024691, dated Jul. 10, 2015.

(Continued)

*Primary Examiner* — Christopher Revak
(74) *Attorney, Agent, or Firm* — Banner & Witcoff, Ltd.

(57) ABSTRACT

Aspects of this disclosure relate to filtering network data transfers. In some variations, multiple packets may be received. A determination may be made that a portion of the packets have packet header field values corresponding to a packet filtering rule. Responsive to such a determination, an operator specified by the packet filtering rule may be applied to the portion of packets having the packet header field values corresponding to the packet filtering rule. A further determination may be made that one or more of the portion of the packets have one or more application header field values corresponding to one or more application header field criteria specified by the operator. Responsive to such a determination, at least one packet transformation function specified by the operator may be applied to the one or more of the portion of the packets.

20 Claims, 4 Drawing Sheets

(56) References Cited

U.S. PATENT DOCUMENTS

| | | | |
|---|---|---|---|
| 7,721,084 B2* | 5/2010 | Salminen et al. | 713/150 |
| 7,818,794 B2 | 10/2010 | Wittman | |
| 8,004,994 B1 | 8/2011 | Darisi et al. | |
| 8,306,994 B2 | 11/2012 | Kenworthy | |
| 8,806,638 B1 | 8/2014 | Mani | |
| 8,856,926 B2 | 10/2014 | Narayanaswamy et al. | |
| 8,935,785 B2 | 1/2015 | Pandrangi | |
| 9,124,552 * | 9/2015 | Moore | H04L 63/0263 726/13 |
| 2001/0039624 A1 | 11/2001 | Kellum | |
| 2002/0049899 A1 | 4/2002 | Kenworthy | |
| 2003/0035370 A1 | 2/2003 | Brustoloni | |
| 2003/0097590 A1 | 5/2003 | Syvanne | |
| 2003/0123456 A1 | 7/2003 | Denz et al. | |
| 2003/0142681 A1 | 7/2003 | Chen et al. | |
| 2003/0145225 A1 | 7/2003 | Bruton, III et al. | |
| 2003/0154297 A1 | 8/2003 | Suzuki et al. | |
| 2003/0188192 A1 | 10/2003 | Tang et al. | |
| 2003/0212900 A1 | 11/2003 | Liu et al. | |
| 2004/0088542 A1 | 5/2004 | Daude et al. | |
| 2004/0151155 A1 | 8/2004 | Jouppi | |
| 2005/0117576 A1 | 6/2005 | McDysan et al. | |
| 2005/0138204 A1 | 6/2005 | Iyer et al. | |
| 2005/0141537 A1 | 6/2005 | Kumar et al. | |
| 2006/0048142 A1 | 3/2006 | Roese et al. | |
| 2006/0114899 A1 | 6/2006 | Toumura et al. | |
| 2006/0136987 A1 | 6/2006 | Okuda | |
| 2006/0146879 A1 | 7/2006 | Anthias et al. | |
| 2006/0195896 A1 | 8/2006 | Fulp et al. | |
| 2006/0212572 A1 | 9/2006 | Afek et al. | |
| 2006/0248580 A1 | 11/2006 | Fulp et al. | |
| 2007/0083924 A1 | 4/2007 | Lu | |
| 2007/0240208 A1 | 10/2007 | Yu et al. | |
| 2008/0005795 A1 | 1/2008 | Acharya et al. | |
| 2008/0072307 A1 | 3/2008 | Maes | |
| 2008/0235755 A1 | 9/2008 | Blaisdell et al. | |
| 2009/0172800 A1 | 7/2009 | Wool | |
| 2009/0328219 A1 | 12/2009 | Narayanaswamy | |
| 2010/0011434 A1 | 1/2010 | Kay | |
| 2010/0082811 A1 | 4/2010 | Van Der Merwe et al. | |
| 2010/0132027 A1 | 5/2010 | Ou | |
| 2010/0211678 A1 | 8/2010 | McDysan et al. | |
| 2010/0242098 A1 | 9/2010 | Kenworthy | |
| 2010/0296441 A1 | 11/2010 | Barkan | |
| 2011/0055916 A1 | 3/2011 | Ahn | |
| 2011/0088092 A1 | 4/2011 | Nguyen et al. | |
| 2011/0185055 A1 | 7/2011 | Nappier et al. | |
| 2011/0270956 A1 | 11/2011 | McDysan et al. | |
| 2012/0113987 A1 | 5/2012 | Riddoch et al. | |
| 2012/0240135 A1 | 9/2012 | Risbood et al. | |
| 2012/0264443 A1 | 10/2012 | Ng et al. | |
| 2012/0314617 A1 | 12/2012 | Erichsen et al. | |
| 2012/0331543 A1 | 12/2012 | Bostrom et al. | |
| 2013/0059527 A1 | 3/2013 | Hasesaka et al. | |
| 2013/0061294 A1 | 3/2013 | Kenworthy | |
| 2013/0254766 A1 | 9/2013 | Zuo et al. | |
| 2014/0283004 A1* | 9/2014 | Moore | 726/13 |

FOREIGN PATENT DOCUMENTS

| | | |
|---|---|---|
| EP | 2385676 A1 | 11/2011 |
| EP | 2498442 A1 | 9/2012 |
| WO | 2005046145 A1 | 5/2005 |

OTHER PUBLICATIONS

International Preliminary Report on Patentability for International App. No. PCT/US2013/072566, dated Jul. 23, 2015.

Statement RE: Related Application, dated Jul. 24, 2015.

Greenwald et al., Designing an Academic Firewall: Policy, Practice, and Experience with SURF, Proceedings of SNDSS '96, IEEE, 1996, Department of Computer Science, Stanford University, Stanford, CA.

Reumann et al., Adaptive Packet Filters, IEEE, 2001, Department of Electrical Engineering and Computer Science, The University of Michigan, Ann Arbor, MI.

Mizuno et al., A New Remote Configurable Firewall System for Home-use Gateways, IEEE, 2004, NTT Information Sharing Platform Laboratories.

Kindervag et al., Build Security Into Your Network's DNA: The Zero Trust Network Architecture, Nov. 5, 2010, Forrester Research, Inc., Cambridge MA.

Moore, SBIR Case Study: Centripetal Networks, How CNI Leveraged DHS S&T SBIR Funding to Launch a Successful Cyber Security Company, Cyber Security Division, 2012 Principal Investigators' Meeting, Oct. 10, 2012, Centripetal Networks, Inc.

Designing a Zero Trust Network With Next-Generation Firewalls, Palo Alto Networks: Technology Brief, viewed Oct. 21, 2012, Palo Alto Networks, Santa Clara, CA.

Control Plane Policing Implementation Best Practices, Mar. 13, 2013, Cisco Systems.

International Search Report and Written Opinion for International App. No. PCT/US2013/057502, dated Nov. 7, 2013.

International Search Report and Written Opinion for International App. No. PCT/US2013/072566, dated Mar. 24, 2014.

International Search Report and Written Opinion for International App. No. PCT/US2014/023286, dated Jun. 24, 2014.

International Search Report and Written Opinion for International App. No. PCT/US2014/027723, dated Jun. 26, 2014.

* cited by examiner

| Rule # | IP Protocol | Source IP Address | Source Port | Destination IP Address | Destination Port | Operator |
|---|---|---|---|---|---|---|
| 1 (302) | TCP | 140.210.* | * | 140.212.* | 22 | ALLOW |
| 2 (304) | TCP | 140.210.* | * | 140.212.* | 25 | ALLOW |
| 3 (306) | TCP | 140.210.* | * | 140.212.* | 110 | ALLOW |
| 4 (308) | TCP | 140.210.* | * | 140.212.* | 143 | ALLOW |
| 5 (310) | TCP | 140.210.* | * | 140.212.* | 443 | REQUIRE-TLS-1.1-1.2 |
| 6 (312) | TCP | 140.210.* | * | 214.* | 80 | HTTP-EXFIL |
| 7 (314) | * | * | * | * | * | BLOCK |

Five-tuple

FILTERING NETWORK DATA TRANSFERS

CROSS-REFERENCE TO RELATED APPLICATION

This application is a continuation of and claims priority to U.S. patent application Ser. No. 13/795,822, filed Mar. 12, 2013, which is now U.S. Pat. No. 9,124,552, and entitled "FILTERING NETWORK DATA TRANSFERS," the disclosure of which is incorporated by reference herein in its entirety and made part hereof.

BACKGROUND

The TCP/IP network protocols (e.g., the Transmission Control Protocol (TCP) and the Internet Protocol (IP)) were designed to build large, resilient, reliable, and robust networks. Such protocols, however, were not originally designed with security in mind. Subsequent developments have extended such protocols to provide for secure communication between peers (e.g., Internet Protocol Security (IPsec)), but the networks themselves remain vulnerable to attack (e.g., Distributed Denial-of-Service (DDoS) attacks, phishing attacks, and the like).

A category of cyber attack known as exfiltrations (e.g., stealing sensitive data or credentials via the Internet) has proven to be especially difficult for conventional cyber defense systems to prevent. A first cause is that many exfiltrations are facilitated by using popular network data transfer protocols, such as the Hypertext Transfer Protocol (HTTP) used by the World Wide Web, that often appear to an observer (e.g., a conventional cyber defense system) as normal network behavior. A second cause is that typical network trust models, such as those used by network firewalls, interpret exfiltrations as trusted operations. A third cause is that human users often knowingly or unknowingly engage in network activities that are vulnerable to attack. A fourth cause is the general inability of conventional cyber defense systems to scale sufficiently to counter a cyber threat; for example, with respect to traffic volumes, network link speeds, network performance (e.g., latency and packet loss requirements), network usage policy enforcement, etc. Accordingly, many cyber attacks (e.g., DDoS attacks and exfiltrations) leverage Internet-scale characteristics to achieve their goals. Moreover, beyond those enumerated here, there are other causes for the failure of conventional, state-of-the-art cyber defense systems to prevent cyber attacks, such as exfiltrations.

SUMMARY

The following presents a simplified summary in order to provide a basic understanding of some aspects of the disclosure. It is neither intended to identify key or critical elements of the disclosure nor to delineate the scope of the disclosure. The following summary merely presents some concepts in a simplified form as a prelude to the detailed description below.

Aspects of this disclosure relate to filtering network data transfers. In some variations, multiple packets may be received. A determination may be made that a portion of the packets have packet header field values corresponding to a packet filtering rule. Responsive to such a determination, an operator specified by the packet filtering rule may be applied to the portion of packets having the packet header field values corresponding to the packet filtering rule. A further determination may be made that one or more of the portion of the packets have one or more application header field values corresponding to one or more application header field criteria specified by the operator. Responsive to such a determination, at least one packet transformation function specified by the operator may be applied to the one or more of the portion of the packets.

In some embodiments, a network packet filter may be located at a boundary between a secured network and an unsecured network (e.g., the Internet). The filter may observe packets traversing the network link between the secured network and the unsecured network. The filter may be capable of comparing certain packet header information (e.g., source and destination IP address(es), source and destination port(s), and protocol type(s)) with one or more packet filtering rules, which may define a network usage policy or network security policy. One or more of the rules may be associated with an operator that may be applied to a packet that matches one or more criteria specified by the rule.

Such packet filters may implement at least two operators: an identity operator, which may allow the packet to continue towards its destination, and a null operator which may prevent, or block, the packet from continuing towards its destination. In some embodiments, the network packet filter may implement one or more additional operators having the capability to determine if a packet contains an application-level header that specifies a particular method associated with a data transfer protocol; and, if so, whether to apply an identity operator or null operator to the packet. To distinguish a network packet filter that implements said additional operators from network packet filters that do not, a network packet filter that implements such additional operators will be referred to hereinafter as a packet security gateway (PSG).

For example, such an operator may be able to perform one or more of the following functions: (1) determine if an IP packet traversing a boundary contains an HTTP packet (e.g., an application-level HTTP packet) that specifies one or more specific HTTP methods (e.g., GET, PUT, POST, etc.), and (2) allow the packet (e.g., if a GET method is specified), or block the packet (e.g., if a PUT or POST method is specified). One or more administrators of the secured network may associate such an operator with one or more rules in a network security policy in order to enforce, via the PSG, a Web usage policy that may, for example, allow users to surf (e.g., GET) to one or more web sites attached to the Internet, but may prevent such user(s) from one or more of writing (e.g., PUT) data files or posting (e.g., POST) forms to one or more web sites. For example, administrator(s) may utilize such functionality to prevent one or more exfiltrations (e.g., file transfers containing sensitive information, posting of login credentials (usernames and passwords), etc.) to network nodes (e.g., web sites) that they may not trust.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements.

FIG. 3 illustrates an exemplary dynamic security policy with operators that filter on data transfer protocol, or application-layer protocol, header information.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. These connections are general and, unless specified otherwise, may be direct or indirect, wired or wireless, physical or logical. In this respect, the specification is not intended to be limiting.

Figure 1:
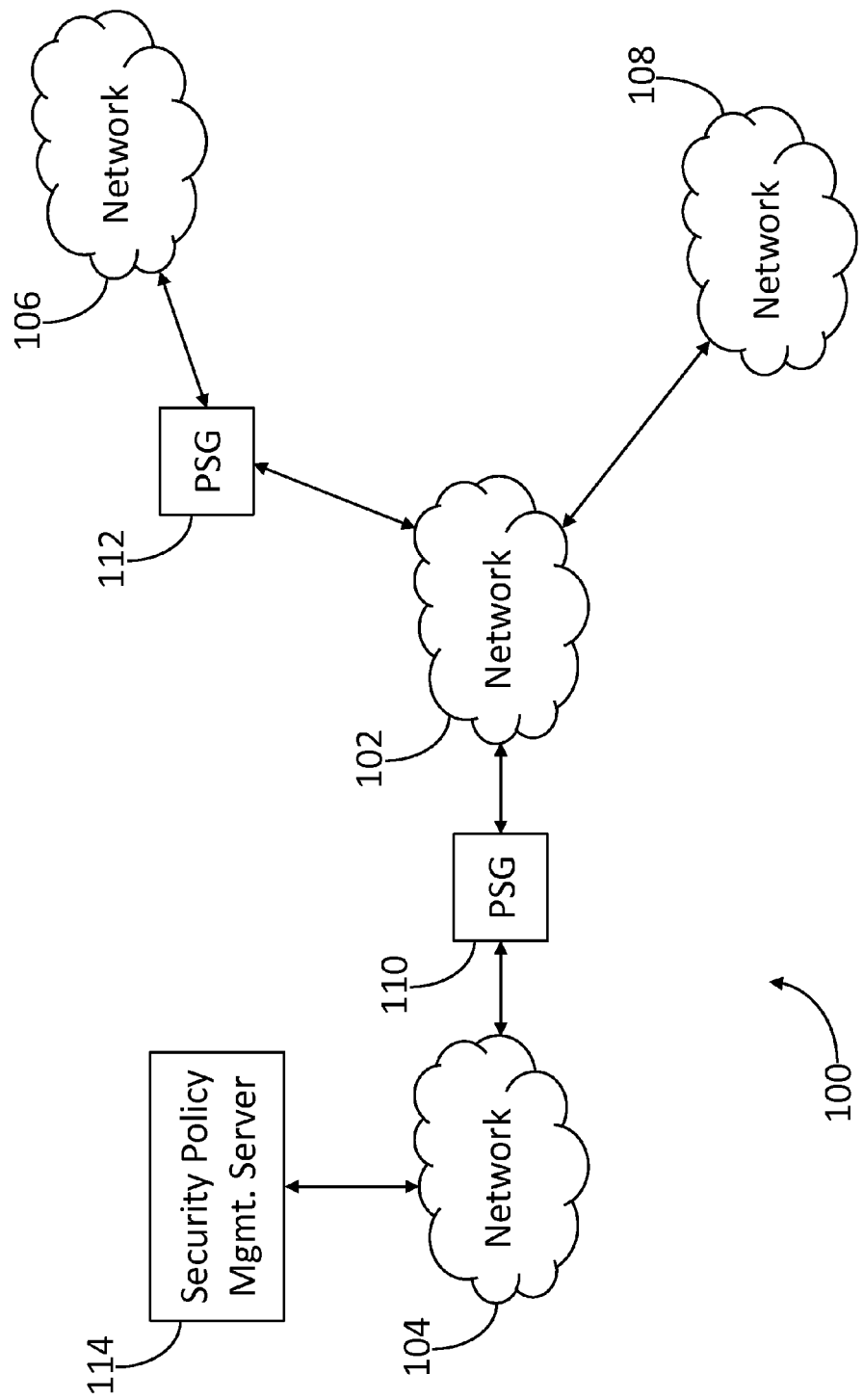
FIG. 1 illustrates an exemplary network environment in which one or more aspects of the disclosure may be implemented.

FIG. 1 illustrates an exemplary network environment 100 in which one or more aspects of the disclosure may be implemented. Referring to FIG. 1, network 102 may function as an interconnect between networks 104, 106, and 108. For example, network 102 may be the public Internet, or some other large TCP/IP network functioning as an interconnect between one or more Local Area Networks (LANs) or Wide-Area Networks (WANs), (e.g., the Non-classified Internet Protocol (IP) Router Network (NIPRNet), operated by the United States Defense Information Systems Agency (DISA)). Networks 104, 106, and 108 may be LANs or WANs operated by or otherwise associated with various organizations (e.g., one or more commercial enterprises, companies, universities, military commands, government agencies, or cyber criminal organizations).

For example, a geographically distributed commercial enterprise X may own and operate networks 104 and 106, and use network 102 (e.g., the Internet) to interconnect networks 104 and 106, and to access other networks (e.g., other networks not owned or operated by enterprise X) attached to network 102. One or more computing devices (e.g., workstations, servers, etc.) of enterprise X may be attached to network 104 or 106. Network 108 may be owned and operated by a cyber criminal organization Z, which may attempt to steal information (e.g., sensitive data) from enterprise X, for example, via network 102. Members of organization Z may attach one or more computing devices (e.g., workstations or servers) to network 108, and may use these workstation(s) or server(s) to attack or collect data from one or more networks affiliated with enterprise X (e.g., network 104 or 106).

As used herein, a packet security gateway (PSG) may include one or more computing devices configured to receive packets, and apply one or more filters or operators, including an identity (e.g., allow) or null (e.g., block) operator, to the packets. In some embodiments, a packet security gateway may be configured to apply one or more additional operators as described herein. As used herein, a security policy management server may include one or more computing devices configured to communicate a dynamic security policy to a packet security gateway. In some embodiments, a security policy management server may be configured to perform one or more additional functions as described herein. As used herein, a dynamic security policy may include one or more rules, messages, instructions, files, data structures, or the like specifying criteria corresponding to one or more packets and may identify one or more operators to be applied to packets corresponding to the specified criteria. In some embodiments, a dynamic security policy may specify one or more additional parameters as described herein.

Network environment 100 may include one or more packet security gateways and one or more security policy management servers. For example, network environment 100 may include packet security gateways 110 and 112, and security policy management server 114. One or more security policy management servers may be associated with a protected network. For example, networks 104 and 106 may each be distinct LANs associated with a common enterprise X, and may each form part of a protected or secured network associated with security policy management server 114. Enterprise X may desire to prevent cyber attacks (e.g., exfiltrations) from one or more of its networks (e.g., network 104 or 106). Accordingly, it may locate one or more packet security gateways at each boundary between its networks and one or more public interconnect networks (e.g., network 102), which may be utilized by a cyber criminal, such as organization Z, to attempt to remotely access its networks (e.g., network 104 or 106), and which may, for example, potentially be used to attempt to transfer data from one or more of its networks (e.g., network 104 or 106) to one or more networks affiliated with organization Z (e.g., network 108). For example, packet security gateway 110 may protect network 104 from one or more cyber attacks (e.g., exfiltrations) mediated by network 102 (e.g., the Internet), and packet security gateway 112 may protect network 106 from one or more cyber attacks (e.g., exfiltrations) mediated by network 102.

As will be described in greater detail below, each of one or more packet security gateways associated with a security policy management server may be configured to receive a dynamic security policy from a security policy management server, receive packets associated with a network protected by the packet security gateway, and perform one or more operations specified by the dynamic security policy on the packets. For example, each of packet security gateways 110 and 112 may be configured to receive a dynamic security policy from security policy management server 114. Each of packet security gateways 110 and 112 may also be configured to receive packets associated with networks 104, 106, or 108. Each of packet security gateways 110 and 112 may further be configured to apply one or more rules or operators specified by the dynamic security policy received from security policy management server 114 to packets associated with networks 104, 106, or 108.

Figure 2:
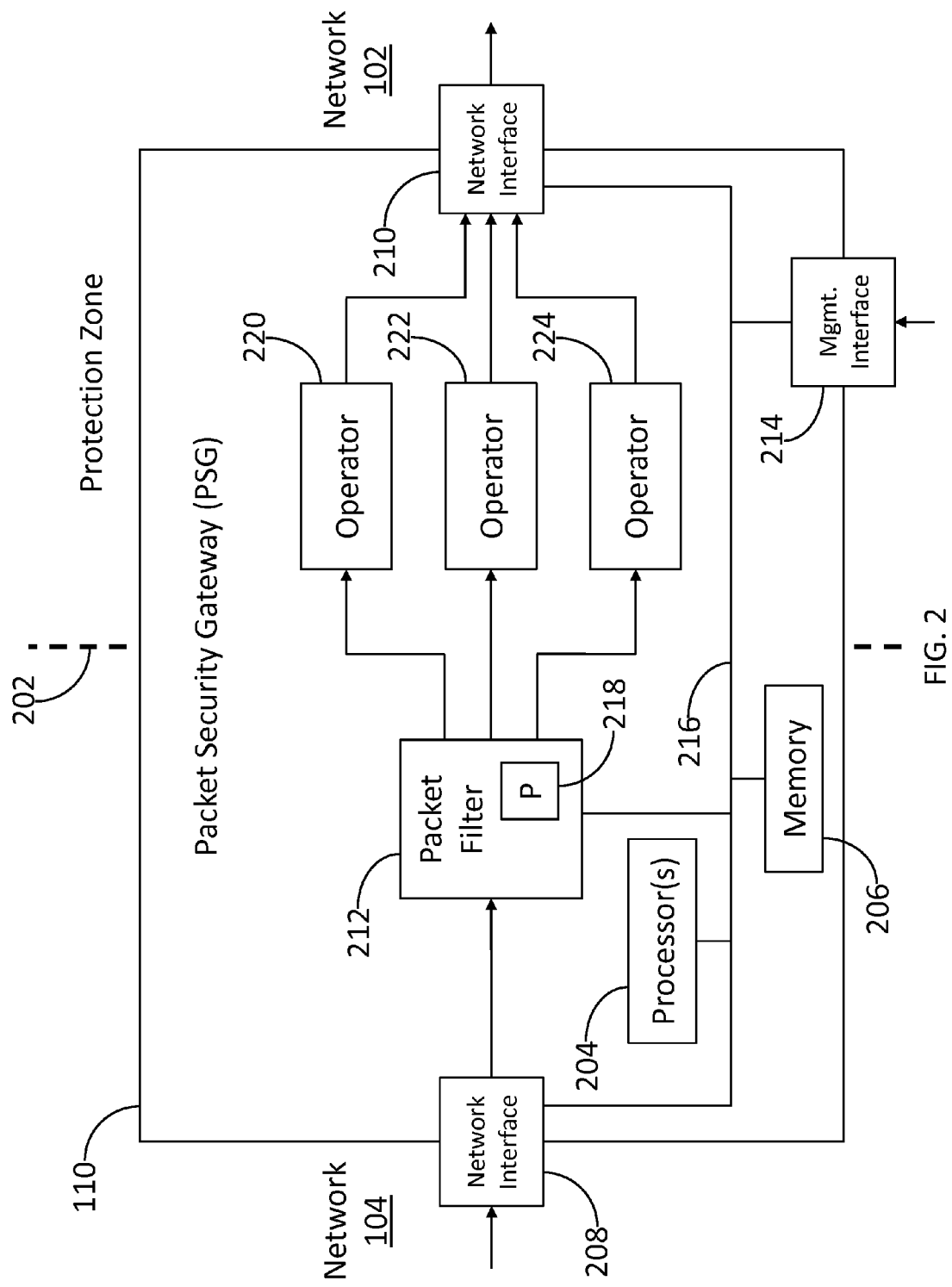
FIG. 2 illustrates an exemplary packet security gateway.

FIG. 2 illustrates an exemplary packet security gateway according to one or more aspects of the disclosure. Referring to FIG. 2, as indicated above, packet security gateway 110 may be located at network boundary 202 between networks 104 and 102. Packet security gateway 110 may include one or more processors 204, memory 206, network interfaces 208 and 210, packet filter 212, and management interface 214. Processor(s) 204, memory 206, network interfaces 208 and 210, packet filter 212, and management interface 214 may be interconnected via data bus 216. Network interface 208 may connect packet security gateway 110 to network 104. Similarly, network interface 210 may connect packet security gateway 110 to network 102. Memory 206 may include one or more program modules that when executed by processor(s) 204, may configure packet security gateway 110 to perform one or more of various functions described herein.

Packet security gateway 110 may be configured to receive a dynamic security policy from security policy management server 114. For example, packet security gateway 110 may receive dynamic security policy 218 from security policy management server 114 via management interface 214 (e.g., via out-of-band signaling) or network interface 208 (e.g., via in-band signaling). Packet security gateway 110 may include one or more packet filters or packet discriminators, or logic for implementing one or more packet filters or packet discriminators. For example, packet security gateway 110 may include packet filter 212, which may be configured to examine information associated with packets received by packet security gateway 110 and forward such packets to one or more of operators 220, 222, or 224 based on the examined information. For example, packet filter 212 may examine information associated with packets received by packet security gateway 110 (e.g., packets received from network 104 via network interface 208) and forward the packets to one or more of operators 220, 222, or 224 based on the examined information.

As will be described in greater detail below, dynamic security policy 218 may include one or more rules and the configuration of packet filter 212 may be based on one or more of the rules included in dynamic security policy 218. For example, dynamic security policy 218 may include one or more rules specifying that packets having specified information should be forwarded to operator 220, that packets having different specified information should be forwarded to operator 222, and that all other packets should be forwarded to operator 224. Operators 220, 222, and 224 may be configured to perform one or more functions on packets they receive from packet filter 212. For example, one or more of operators 220, 222, or 224 may be configured to forward packets received from packet filter 212 into network 102, forward packets received from packet filter 212 to an IPsec stack (not illustrated) having an IPsec security association corresponding to the packets, or drop packets received from packet filter 212. In some embodiments, one or more of operators 220, 222, or 224 may be configured to drop packets by sending the packets to a local "infinite sink" (e.g., the /dev/null device file in a UNIX/LINUX system).

FIG. 3 illustrates an exemplary dynamic security policy in accordance with one or more embodiments. Referring to FIG. 3, dynamic security policy 218 may include rules 1 302, 2 304, 3 306, 4 308, 5 310, 6 312, and 7 314. Each of these rules may specify criteria and one or more operators that may be applied to packets associated with (e.g., matching) the specified criteria. The specified criteria may take the form of a five-tuple, which may, for example, comprise one or more values selected from, packet header information, specifying a protocol type of the data section of an IP packet (e.g., TCP, User Datagram Protocol (UDP), Internet Control Message Protocol (ICMP), or one or more other protocols), one or more source IP addresses, one or more source port values, one or more destination IP addresses, and one or more destination ports.

For example, rule 1 302 may specify that IP packets containing one or more TCP packets, originating from a source IP address that begins with 140.210, having any source port, destined for an IP address that begins with 140.212, and destined for port 22 (e.g., associated with the Secure Shell (SSH) protocol) should have an ALLOW operator (e.g., an identity operator) applied to them. Similarly, rule 2 304 may specify that IP packets containing one or more TCP packets, originating from a source IP address that begins with 140.210, having any source port, destined for an IP address that begins with 140.212, and destined for port 25 (e.g., associated with the Simple Mail Transfer Protocol (SMTP)) should have an ALLOW operator applied to them.

Rule 3 306 may specify that IP packets containing one or more TCP packets, originating from a source IP address that begins with 140.210, having any source port, destined for an IP address that begins with 140.212, and destined for port 110 (e.g., associated with Post Office Protocol version 3 (POP3)) should have an ALLOW operator applied to them.

Rule 4 308 may specify that IP packets containing one or more TCP packets, originating from a source IP address that begins with 140.210, having any source port, destined for an IP address that begins with 140.212, and destined for port 143 (e.g., associated with the Internet Message Access Protocol (IMAP)) should have an ALLOW operator applied to them.

Rule 5 310 may specify that IP packets containing one or more TCP packets, originating from a source IP address that begins with 140.210, having any source port, destined for an IP address that begins with 140.212, and destined for port 443 (e.g., associated with the port for the Hypertext Transfer Protocol Secure (HTTPS) protocol) should have a specified Transport Layer Security (TLS) protocol (e.g., REQUIRE-TLS 1.1-1.2) operator (as described in greater detail below) applied to them.

Rule 7 314 may be a "wildcard" rule and may apply a BLOCK operator (e.g., a null operator which "drops" any packets it is applied to) to any packets that do not match the criteria of any of Rules 1 302, 2 304, 3 306, 4 308, 5 310, or 6 312 (e.g., when rules 1 302, 2 304, 3 306, 4 308, 5 310, 6 312, and 7 314 are applied to packets in a linear fashion).

As described above with respect to FIG. 1, networks 104 and 106 may be owned or operated by enterprise X. Enterprise X may have allocated IPv4 addresses 140.210.0.0/16 to network 104, and IPv4 addresses 140.212.0.0/16 to network 106. Enterprise X may have loaded PSG 110 with dynamic security policy 218, and may utilize PSG 110 to enforce one or more network security policies embodied in one or more rules of dynamic security policy 218 to restrict network communications between networks 104 and 106 (e.g., to secure system logins, e-mail, encrypted web sessions, and the like). For example, based on standard usage of ports, rule 1 302 may allow any hosts attached to network 104 to conduct Secure Shell (SSH) sessions (e.g., system logins) with any hosts attached to network 106; rule 2 304 may allow any e-mail servers attached to network 104 to conduct SMTP sessions (e.g., e-mail transfer sessions) with any e-mail servers attached to network 106; rule 3 306 and rule 4 308, may respectively allow e-mail clients attached to network 104 to conduct POP3 and IMAP sessions (e.g., e-mail download sessions into a webmail browser application) with any e-mail servers attached to network 106; and rule 5 310 may allow web browsers attached to network 104 to conduct HTTPS sessions (e.g., secure web sessions) with any web servers attached to network 106, but may, as described in greater detail below, utilize the REQUIRE-TLS-1.1-1.2 operator to ensure that only HTTPS secure web sessions using version 1.1 or 1.2 of the Transport Layer Security (TLS) protocol to secure such HTTPS sessions are allowed (e.g., because the popular TLS version 1.0 protocol has a known security vulnerability that attackers may exploit to decrypt HTTPS sessions).

Rule 6 312 may specify that IP packets containing one or more TCP packets, originating from a source IP address that begins with 140.210, having any source port, destined for an IP address that begins with 200.214, and destined for port 80 (e.g., associated with the HTTP protocol) should have an HTTP-EXFIL operator applied to them. As described in greater detail below, an HTTP-EXFIL operator may allow HTTP packets containing a GET method, but may block HTTP packets containing other HTTP methods (e.g., PUT, POST, CONNECT, etc.). Such an operator may thus allow a web browser to "surf the web" (e.g., download web pages hosted by web servers), but may prevent the web browser from writing files to a web server (e.g., using the PUT method), posting forms (e.g., forms that might contain login credentials, such as usernames or passwords) to a web server (e.g., using the POST method), or otherwise communicating with a web server (e.g., using any HTTP method except GET). Because attackers may often use HTTP PUT or POST methods to exfiltrate sensitive data, operators such as HTTP-EXFIL may be used to stop such exfiltrations.

Returning to the example described above, organization Z may own or operate network 108, and may have allocated network IP addresses 214.0.0.0/8 to network 108. Enterprise X may not have a business relationship with organization Z, and may therefore not consider network 108 to be trusted. While enterprise X could simply block all communications to networks that are owned or operated by organizations it does not fully trust, this would likely result in enterprise X blocking access to most of the Internet. Enterprise X's employees, therefore, could not freely surf the Web, which may restrict the employees' ability to conduct business on behalf of enterprise X. By enforcing sets of rules similar to rule 6 312 that may apply operators like or similar to HTTP-EXFIL, enterprise X may enable its employees to freely surf the web and conduct company business, but may prevent one or more cyber attacks (e.g., HTTP-mediated exfiltrations).

One function of operators like HTTP-EXFIL and REQUIRE-TLS-1.1-1.2 may be to inspect fields in the headers of application packets contained in IP packets, determine field values, and depending on the field values, decide to allow, block, or otherwise apply a packet transformation function (e.g., encapsulate the packet into a tunnel, alter one or more header field values, etc.) to the packets. The logic for this function may be executed by one or more of operators 220, 222, or 224. The logic may be developed in a high-level programming language such as C. An example of such programmatic logic, written in pseudocode, for the HTTP-EXFIL operator, is as follows:

Operator HTTP-EXFIL(ip-packet):
Inspect app-pkt(ip-packet) match GET return ALLOW;
Inspect app-pkt(ip-packet) match POST return BLOCK;
Inspect app-pkt(ip-packet) match PUT return BLOCK;
Inspect app-pkt(ip-packet) match DELETE return BLOCK;
Inspect app-pkt(ip-packet) match CONNECT return BLOCK;
Return BLOCK;
End Operator HTTP-EXFIL;

Referring to the above-example, Operator HTTP-EXFIL may accept as input an IP packet that matches a rule, such as rule 6 312 of dynamic security policy 218. If the application packet contained in the IP packet is an HTTP packet, the value of the HTTP method field in the HTTP packet header may be compared to the values that encode the GET, POST, PUT, DELETE, and CONNECT methods. If a match is found, then the HTTP-EXFIL operator may return either ALLOW or BLOCK, depending on the method value. If no match is found, then the HTTP-EXFIL operator may return BLOCK.

An example of programmatic logic, written in pseudocode, for a REQUIRE-TLS-1.1-1.2 operator is provided below. The REQUIRE-TLS-1.1-1.2 operator may be associated with filter rules for HTTPS sessions, such as rule 5 310 of dynamic security policy 218. HTTPS may be used to encrypt HTTP sessions. HTTPS is not a protocol per se, but rather the result of layering the HTTP protocol on top of the TLS protocol. For an HTTPS session composed of IP packets, the application packets contained in the IP packets may be TLS Record Protocol packets. The header fields of TLS Record Protocol packets may not be encrypted. One of the header fields may contain a value indicating the TLS version.

Exemplary programmatic logic for a REQUIRE-TLS-1.1-1.2 operator, written in pseudocode, is as follows:

Operator REQUIRE-TLS-1.1-1.2(ip-packet):
Inspect app-pkt(ip-packet) match 1.0 return BLOCK;
Inspect app-pkt(ip-packet) match 1.1 return ALLOW;
Inspect app-pkt(ip-packet) match 1.2 return ALLOW;
Return BLOCK;
End Operator REQUIRE-TLS-1.1-1.2;

Referring to the above-example, Operator REQUIRE-TLS-1.1-1.2 may accept as input an IP packet that matches a rule, such as rule 5 310 of dynamic security policy 218. If the application packet contained in the IP packet is a TLS Record Protocol packet, the value of the version field in the TLS Record Protocol packet header may be compared to the values that encode version numbers 1.0, 1.1, and 1.2. If a match is found, then the REQUIRE-TLS-1.1-1.2 operator may return either ALLOW or BLOCK, depending on the version number value. If no match is found, then the REQUIRE-TLS-1.1-1.2 operator may return BLOCK.

The filtering process described herein may be viewed as having two (2) stages: A first stage in which the "5-tuple" of IP packet header field values and transport protocol (e.g., TCP, UDP, etc.) packet header field values may be filtered; and, a second stage in which application packet header field values may be filtered (e.g., by applying operator logic similar to that described above). Conceptually, the first stage may determine if the network policy allows any communications between the resources identified in the 5-tuple rule; if so, the second stage may determine if the policy allows the specific method or type of communication (e.g., file read, file write, encrypted communication, etc.) between the resources. Such a method may, however, be used in other conceptual models.

The methods described above may be modified to achieve different functionality and may be extended to other data transfer protocols or to other application-layer protocols. These methods may provide network administrators with capabilities to enforce network usage policies and network security policies that have capabilities and functionalities beyond those described above. For example, these methods may provide network administrators with capabilities to prevent exfiltrations that are mediated by other data transfer protocols besides HTTP and HTTPS. Examples of such protocols include File Transfer Protocol (FTP) and messaging protocols such as eXtensible Messaging and Presence Protocol (XMPP). Moreover, new network applications may emerge in the future which may use new data transfer protocols or application-layer protocols to which the present methods may be applied. These methods may also be used for purposes other than network policy enforcement and exfiltration prevention. For example, it may be useful for a packet filter to rapidly detect if an IP packet contains a Real-time Transport Protocol (RTP) application packet used to deliver audio or video information (e.g., if a cyber attack based on RTP has yet to be discovered, network administrators may choose to not process RTP packets through the cyber security defense systems that may be protecting their networks).

Figure 4:
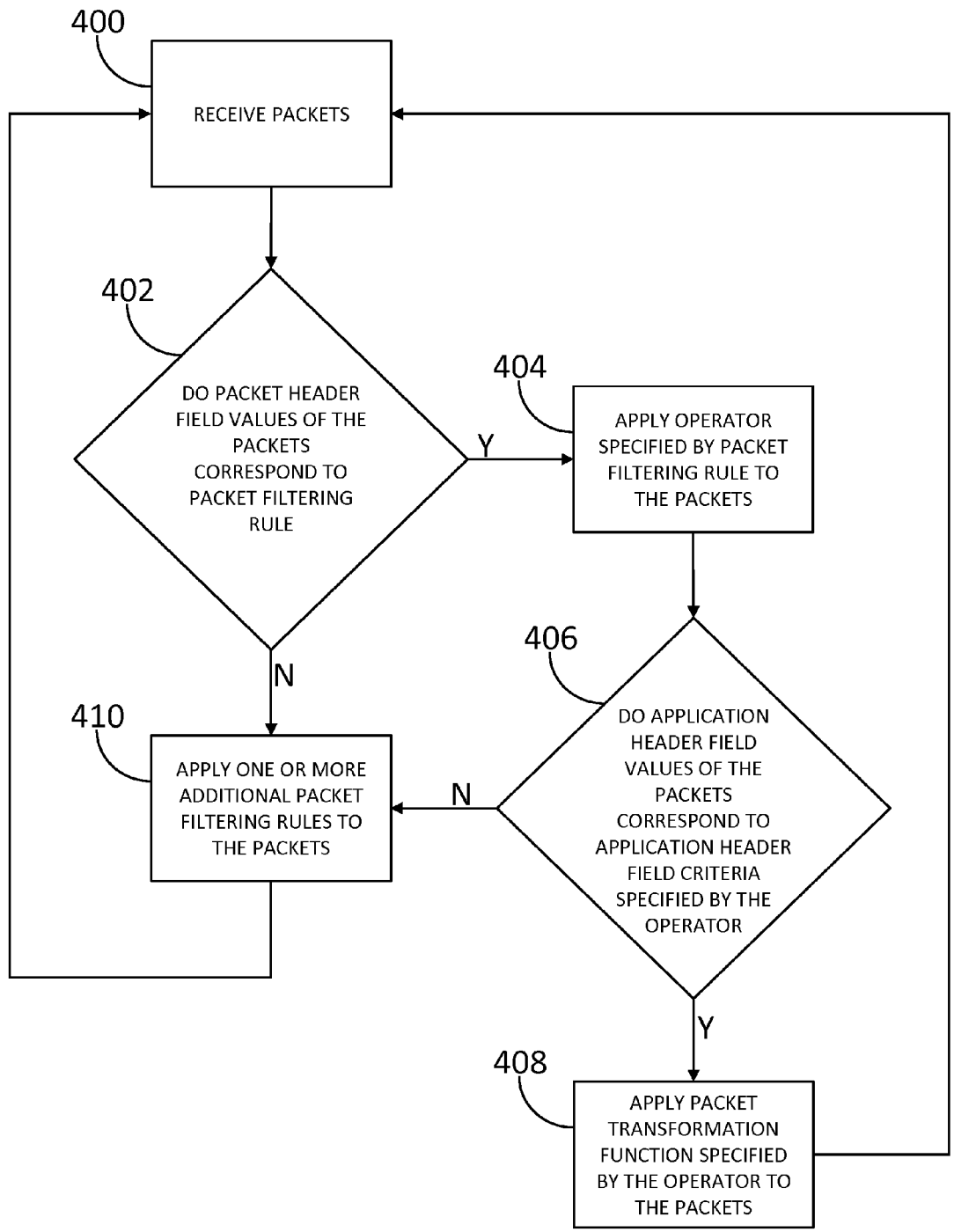
FIG. 4 illustrates an exemplary method for protecting a secured network by enforcing one or more network usage policies or network security policies.

FIG. 4 illustrates an exemplary method for protecting a secured network in accordance with one or more embodiments of the present disclosure. The steps may be performed at one or more packet security gateways associated with a security policy management server. For example, each of packet security gateways 110 and 112 may be associated with security policy management server 114, and the steps may be performed at packet security gateway 110 or 112. At step 400, packets may be received. For example, packet security gateway 110 may receive packets from network 104 via network interface 208 that are destined for network 106. At step 402, a determination may be made as to whether a portion of the received packets have packet header field values corresponding to a packet filtering rule. For example, a determination may be made as to whether a portion of the packets received from network 104 have packet header field values (e.g., one or more of one or more data section protocols, one or more source IP addresses, one or more source ports, one or more destination IP addresses, or one or more destination ports) corresponding to rule 5 310. At step 404, responsive to determining that one or more of the portion of received packets have packet header field values corresponding to the packet filtering rule, an operator specified by the packet filtering rule may be applied to the portion of the received packets. For example, the REQUIRE TLS-1.1-1.2 operator specified by rule 5 310 may be applied to the portion of the received packets.

At step 406, a determination may be made as to whether one or more application header field values of one or more of the portion of the received packets correspond to one or more application header field criteria specified by the operator. For example, a determination may be made as to whether one or more of the portion of the received packets have application header field values corresponding to one or more application header field criteria of the REQUIRE TLS-1.1-1.2 operator specified by rule 5 310 (e.g., application header field values corresponding to TLS version 1.1 or 1.2). At step 408, responsive to determining that one or more of the portion of received packets have application header field values corresponding to one or more application header field criteria specified by the operator, a packet transformation function specified by the operator may be applied to the one or more of the portion of the received packets. For example, an ALLOW packet transformation function specified by the REQUIRE TLS-1.1-1.2 operator may be applied to the one or more of the portion of the received packets having application header field values corresponding to one or more application header field criteria of the REQUIRE TLS-1.1-1.2 operator specified by rule 5 310 (e.g., each of the one or more of the portion of the received packets may be allowed to continue toward their respective destinations). The method may then return to step 400 and await receipt of one or more additional packets (e.g., one or more additional packets from network 104 received via network interface 208 that are destined for network 106).

Returning to step 406, a determination may be made as to whether one or more application header field values of one or more of the portion of the received packets correspond to one or more application header field criteria specified by the operator. For example, a determination may be made as to whether one or more of the portion of the received packets have application header field values corresponding to one or more application header field criteria of the REQUIRE TLS-1.1-1.2 operator specified by rule 5 310 (e.g., application header field values corresponding to TLS version 1.1 or 1.2). Responsive to determining that one or more of the portion of received packets have application header field values that do not correspond to one or more application header field criteria specified by the operator, one or more additional packet filtering rules may be applied to the one or more of the portion of the received packets. For example, rule 7 314 may be applied to the one or more of the portion of the received packets having application header field values that do not correspond to one or more application header field criteria of the REQUIRE TLS-1.1-1.2 operator specified by rule 5 310 (e.g., each of the one or more of the portion of the received packets may be blocked from continuing toward their respective destinations). The method may then return to step 400 and await receipt of one or more additional packets (e.g., one or more additional packets from network 104 received via network interface 208 that are destined for network 106).

Returning to step 402, a determination may be made as to whether a portion of the received packets have packet header field values corresponding to a packet-filtering rule. For example, a determination may be made as to whether a portion of the packets received from network 104 have packet header field values (e.g., one or more of one or more data section protocols, one or more source IP addresses, one or more source ports, one or more destination IP addresses, or one or more destination ports) corresponding to rule 5 310. Responsive to determining that the portion of received packets have packet header field values that do not correspond to the packet filtering rule, one or more additional packet filtering rules may be applied to the one or more of the portion of the received packets. For example, rule 7 314 may be applied to the portion of received packets that do not have packet header field values that correspond to rule 5 310 (e.g., each of the portion of the received packets may be blocked from continuing toward their respective destinations). The method may then return to step 400 and await receipt of one or more additional packets (e.g., one or more additional packets from network 104 received via network interface 208 that are destined for network 106).

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, etc. As will be appreciated, the functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and one or more networks. The functionality may be distributed in any manner, or may be located in a single computing device (e.g., a server, a client computer, etc.).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional.

What is claimed is:

1. A method comprising:
   receiving, by a computing system provisioned with a plurality of packet-filtering rules, a first packet and a second packet;
   responsive to a determination by the computing system that the first packet comprises data corresponding to a transport layer security (TLS)-version value for which one or more packet-filtering rules of the plurality of packet-filtering rules indicate packets should be forwarded toward their respective destinations, forwarding, by the computing system, the first packet toward its destination; and
   responsive to a determination by the computing system that the second packet comprises data corresponding to a TLS-version value for which the one or more packet-filtering rules indicate packets should be blocked from continuing toward their respective destinations, dropping, by the computing system, the second packet.

2. The method of claim 1, comprising:
   receiving, by the computing system, a plurality of packets comprising a first portion of packets and a second portion of packets, the first portion comprising the first packet and the second packet;
   applying, by the computing system and to each packet in the first portion of packets, at least one of the one or more packet-filtering rules to determine whether the packet should be forwarded by the computing system toward its destination or blocked by the computing system from continuing toward its destination; and
   determining, by the computing system, for each packet in the second portion of packets, and without applying the one or more packet-filtering rules, whether the packet should be forwarded by the computing system toward its destination or blocked by the computing system from continuing toward its destination.

3. The method of claim 2, wherein:
   determining, for each packet in the second portion of packets, whether the packet should be forwarded by the computing system toward its destination or blocked by the computing system from continuing toward its destination comprises applying, by the computing system and to each packet in the second portion of packets, one or more other packet-filtering rules of the plurality of packet-filtering rules; and
   applying the at least one of the one or more packet-filtering rules comprises applying, to each packet in the first portion of packets, the at least one of the one or more packet-filtering rules responsive to a determination by the computing system that the packet corresponds to one or more criteria specified by the one or more other packet-filtering rules.

4. The method of claim 3, wherein applying the at least one of the one or more packet-filtering rules comprises applying, to each packet in the first portion of packets, the at least one of the one or more packet-filtering rules responsive to at least one of a determination by the computing system that the packet comprises a network address indicated by the one or more criteria, a determination by the computing system that the packet comprises a port number indicated by the one or more criteria, or a determination by the computing system that the packet comprises data corresponding to a protocol type indicated by the one or more criteria.

5. The method of claim 1, comprising responsive to a determination by the computing system that the first packet comprises data corresponding to at least one of a hypertext transfer protocol (HTTP) PUT method, an HTTP POST method, an HTTP DELETE method, or an HTTP CONNECT method, applying, by the computing system and to the first packet, at least one of the one or more packet-filtering rules.

6. The method of claim 1, comprising responsive to a determination by the computing system that the second packet comprises data corresponding to at least one of a hypertext transfer protocol (HTTP) PUT method, an HTTP POST method, an HTTP DELETE method, or an HTTP CONNECT method, applying, by the computing system and to the second packet, at least one of the one or more packet-filtering rules.

7. The method of claim 1, comprising:
   responsive to a determination by the computing system that the first packet comprises data associated with hypertext transfer protocol secure (HTTPS), applying, by the computing system and to the first packet, at least one of the one or more packet-filtering rules; and
   responsive to a determination by the computing system that the second packet comprises data associated with HTTPS, applying, by the computing system and to the second packet, at least one of the one or more packet-filtering rules.

8. A system comprising:
   at least one processor; and
   a memory storing instructions that when executed by the at least one processor cause the system to:
      receive data comprising a plurality of packet-filtering rules, a first packet, and a second packet;
      responsive to a determination that the first packet comprises data corresponding to a transport layer security (TLS)-version value for which one or more packet-filtering rules of the plurality of packet-filtering rules indicate packets should be forwarded toward their respective destinations, forward the first packet toward its destination; and
      responsive to a determination that the second packet comprises data corresponding to a TLS-version value for which the one or more packet-filtering rules indicate packets should be blocked from continuing toward their respective destinations, drop the second packet.

9. The system of claim 8, wherein the instructions, when executed by the at least one processor, cause the system to:
   receive a plurality of packets comprising a first portion of packets and a second portion of packets, the first portion comprising the first packet and the second packet;
   apply, to each packet in the first portion of packets, at least one of the one or more packet-filtering rules to determine whether the packet should be forwarded toward its destination or blocked from continuing toward its destination; and
   determine, for each packet in the second portion of packets, and without applying the one or more packet-filtering rules, whether the packet should be forwarded toward its destination or blocked from continuing toward its destination.

10. The system of claim 9, wherein the instructions, when executed by the at least one processor, cause the system to:
    apply, to each packet in the second portion of packets, one or more other packet-filtering rules of the plurality of packet-filtering rules to determine whether the packet should be forwarded toward its destination or blocked from continuing toward its destination; and for each packet in the first portion of packets, apply the at least one of the one or more packet-filtering rules responsive to determining that the packet corresponds to one or more criteria specified by the one or more other packet-filtering rules.

11. The system of claim 10, wherein the instructions, when executed by the at least one processor, cause the system to, for each packet in the first portion of packets, apply the at least one of the one or more packet-filtering rules responsive to at least one of determining that the packet comprises a network address indicated by the one or more criteria, determining that the packet comprises a port number indicated by the one or more criteria, or determining that the packet comprises data corresponding to a protocol type indicated by the one or more criteria.

12. The system of claim 8, wherein the instructions, when executed by the at least one processor, cause the system to apply at least one of the one or more packet-filtering rules to the first packet responsive to determining that the first packet comprises data corresponding to at least one of a hypertext transfer protocol (HTTP) PUT method, an HTTP POST method, an HTTP DELETE method, or an HTTP CONNECT method.

13. The system of claim 8, wherein the instructions, when executed by the at least one processor, cause the system to apply at least one of the one or more packet-filtering rules to the second packet responsive to determining that the second packet comprises data corresponding to at least one of a hypertext transfer protocol (HTTP) PUT method, an HTTP POST method, an HTTP DELETE method, or an HTTP CONNECT method.

14. The system of claim 8, wherein the instructions, when executed by the at least one processor, cause the system to:
apply at least one of the one or more packet-filtering rules to the first packet responsive to determining that the first packet comprises data associated with hypertext transfer protocol secure (HTTPS); and
apply at least one of the one or more packet-filtering rules to the second packet responsive to determining that the second packet comprises data associated with HTTPS.

15. One or more non-transitory computer-readable media comprising instructions that when executed by one or more computing devices cause the one or more computing devices to:
receive data comprising a plurality of packet-filtering rules, a first packet, and a second packet;
responsive to a determination that the first packet comprises data corresponding to a transport layer security (TLS)-version value for which one or more packet-filtering rules of the plurality of packet-filtering rules indicate packets should be forwarded toward their respective destinations, forward the first packet toward its destination; and
responsive to a determination that the second packet comprises data corresponding to a TLS-version value for which the one or more packet-filtering rules indicate packets should be blocked from continuing toward their respective destinations, drop the second packet.

16. The one or more non-transitory computer-readable media of claim 15, wherein the instructions, when executed by the one or more computing devices, cause the one or more computing devices to:

receive a plurality of packets comprising a first portion of packets and a second portion of packets, the first portion comprising the first packet and the second packet;
apply, to each packet in the first portion of packets, at least one of the one or more packet-filtering rules to determine whether the packet should be forwarded toward its destination or blocked from continuing toward its destination; and
determine, for each packet in the second portion of packets, and without applying the one or more packet-filtering rules, whether the packet should be forwarded toward its destination or blocked from continuing toward its destination.

17. The one or more non-transitory computer-readable media of claim 16, wherein the instructions, when executed by the one or more computing devices, cause the one or more computing devices to:
apply, to each packet in the second portion of packets, one or more other packet-filtering rules of the plurality of packet-filtering rules to determine whether the packet should be forwarded toward its destination or blocked from continuing toward its destination; and
for each packet in the first portion of packets, apply the at least one of the one or more packet-filtering rules responsive to determining that the packet corresponds to one or more criteria specified by the one or more other packet-filtering rules.

18. The one or more non-transitory computer-readable media of claim 17, wherein the instructions, when executed by the one or more computing devices, cause the one or more computing devices to, for each packet in the first portion of packets, apply the at least one of the one or more packet-filtering rules responsive to at least one of determining that the packet comprises a network address indicated by the one or more criteria, determining that the packet comprises a port number indicated by the one or more criteria, or determining that the packet comprises data corresponding to a protocol type indicated by the one or more criteria.

19. The one or more non-transitory computer-readable media of claim 15, wherein the instructions, when executed by the one or more computing devices, cause the one or more computing devices to:
apply at least one of the one or more packet-filtering rules to the first packet responsive to determining that the first packet comprises data corresponding to at least one of a hypertext transfer protocol (HTTP) PUT method, an HTTP POST method, an HTTP DELETE method, or an HTTP CONNECT method; and
apply at least one of the one or more packet-filtering rules to the second packet responsive to determining that the second packet comprises data corresponding to at least one of an HTTP PUT method, an HTTP POST method, an HTTP DELETE method, or an HTTP CONNECT method.

20. The one or more non-transitory computer-readable media of claim 15, wherein the instructions, when executed by the one or more computing devices, cause the one or more computing devices to:
apply at least one of the one or more packet-filtering rules to the first packet responsive to determining that the first packet comprises data associated with hypertext transfer protocol secure (HTTPS); and
apply at least one of the one or more packet-filtering rules to the second packet responsive to determining that the second packet comprises data associated with HTTPS.

* * * * *